United States Patent
Fan et al.

(10) Patent No.: US 11,080,542 B2
(45) Date of Patent: Aug. 3, 2021

(54) SPARSE REGION-OF-INTEREST POOLING FOR OBJECT DETECTION

(71) Applicant: International Business Machines Corporation, Armonk, NY (US)

(72) Inventors: Quanfu Fan, Somerville, MA (US); Richard Chen, Mount Kisco, NY (US)

(73) Assignee: International Business Machines Corporation, Armonk, NY (US)

(*) Notice: Subject to any disclaimer, the term of this patent is extended or adjusted under 35 U.S.C. 154(b) by 354 days.

(21) Appl. No.: 16/047,726

(22) Filed: Jul. 27, 2018

(65) Prior Publication Data
US 2020/0034645 A1    Jan. 30, 2020

(51) Int. Cl.
| | |
|---|---|
| *G06K 9/32* | (2006.01) |
| *G06N 3/08* | (2006.01) |
| *G06T 1/00* | (2006.01) |
| *G06N 7/00* | (2006.01) |
| *G06N 20/00* | (2019.01) |

(52) U.S. Cl.
CPC ............ *G06K 9/3241* (2013.01); *G06N 3/08* (2013.01); *G06N 7/00* (2013.01); *G06N 20/00* (2019.01); *G06T 1/0014* (2013.01)

(58) Field of Classification Search
CPC . G06N 20/00; G06N 3/08; G06N 7/00; G06T 1/0014
See application file for complete search history.

(56) References Cited

U.S. PATENT DOCUMENTS

| | | | |
|---|---|---|---|
| 7,813,581 B1 | 10/2010 | Fitzpatrick et al. | |
| 9,136,006 B2 | 9/2015 | Hung et al. | |
| 9,881,234 B2 | 1/2018 | Huang et al. | |
| 2006/0233423 A1* | 10/2006 | Najafi | G06T 7/75 382/103 |
| 2007/0217676 A1* | 9/2007 | Grauman | G06K 9/6212 382/170 |
| 2015/0362989 A1* | 12/2015 | Tyagi | H04N 5/33 345/156 |
| 2017/0124409 A1* | 5/2017 | Choi | G06N 3/0454 |

(Continued)

FOREIGN PATENT DOCUMENTS

WO   2017139927 A1   8/2017

OTHER PUBLICATIONS

Dai, J., et al., "R-FCN: Object Detection via Region-based Fully Convolutional Networks", https://arxiv.org/abs/1605.06409, arXiv:1605.06409, submitted May 20, 2016, Last revised Jun. 21, 2016, 11 pages.

(Continued)

*Primary Examiner* — Edward Park
(74) *Attorney, Agent, or Firm* — Scully, Scott, Murphy & Presser, P.C.; Daniel P. Morris

(57) ABSTRACT

An image data is convolved with one or more kernels and corresponding one or more feature maps generated. Region of interest maps are extracted from the one or more feature maps, and pooled based on one or more features selected as selective features. Pooling generates a feature vector with dimensionality less than a dimensionality associated with the one or more feature maps. The feature vector is flattened and input as a layer in a neural network. The neural network outputs a classification associated with an object in the image data.

17 Claims, 7 Drawing Sheets

(56) References Cited

U.S. PATENT DOCUMENTS

| | | | |
|---|---|---|---|
| 2017/0169315 A1* | 6/2017 | Vaca Castano | G06K 9/6814 |
| 2018/0012082 A1* | 1/2018 | Satazoda | G06K 9/00805 |
| 2018/0018535 A1 | 1/2018 | Li et al. | |
| 2018/0075336 A1 | 3/2018 | Huang et al. | |
| 2019/0122111 A1* | 4/2019 | Min | G06N 3/0481 |
| 2019/0188541 A1* | 6/2019 | Wang | G01S 17/42 |
| 2019/0325605 A1* | 10/2019 | Ye | G06T 7/73 |
| 2019/0392189 A1* | 12/2019 | Kumar | G06K 9/2018 |
| 2020/0034645 A1* | 1/2020 | Fan | G06T 1/0014 |
| 2020/0225060 A1* | 7/2020 | Davies | G01D 4/002 |

OTHER PUBLICATIONS

Fan, Q., et al., "Sparse Deep Feature Representation for Object Detection from Wearable Cameras", In Proceedings of the British Machine Vision Conference (BMVC 2017), BMVA Press, Sep. 4, 2017, 11 pages.

Fan, Q., et al., "A Sparse Deep Feature Representation for Object Detection from Wearable Cameras", In Proceedings of the British Machine Vision Conference (BMVC 2017), BMVA Press, Sep. 4, 2017, 12 pages.

\* cited by examiner

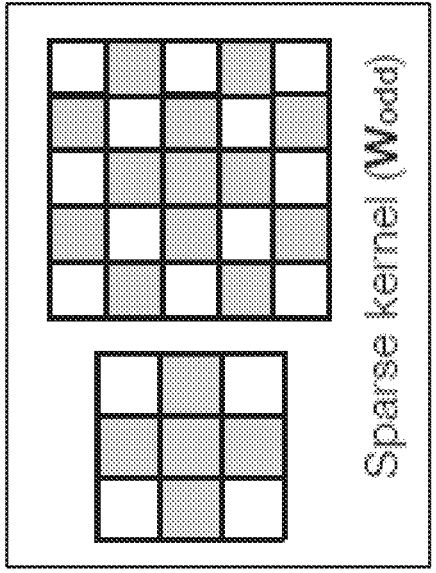
FIG. 4A
FIG. 4B
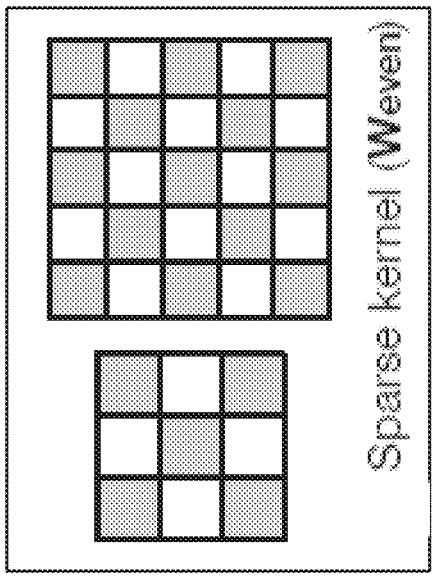
FIG. 5

SPARSE REGION-OF-INTEREST POOLING FOR OBJECT DETECTION

BACKGROUND

The present application relates generally to computers, computer applications and computer vision, and more particularly to automated object detection.

Computer-implemented automatic object detection in data, for example, image data, has many applications, for example, video surveillance, autonomous driving, medical image, robotics, and athletics analytics. Convolutional neural network (CNN)-based approaches have been employed for generic object detection. Among them, region-based CNNs (RCNNs) and faster RCNNs have attributed to advancement in this field, achieving state-of-the-art performance on challenging datasets. A technique in the RCNN approaches is Region-of-Interest (ROI) pooling. With ROI pooling, a CNN feature map inside a candidate region is converted into a smaller feature map by max pooling. The pooled features are subsequently used for classifying the region into one of the objects of interest. However, due to their high dimensionality, ROI features often lead to high complexity of a detection model not only in size but also in computation. Such complexity can limit the applications of RCNN models to real-time image and video analysis.

BRIEF SUMMARY

A computer-implemented system and method of detecting an object in image data may be provided. In one aspect, the method includes receiving image data. The method may also include convolving the image data with one or more kernels, the convolving generating corresponding one or more feature maps. The method may also include extracting region of interest maps from the one or more feature maps. The method may further include pooling the region of interest maps based on one or more features selected as selective features, the pooling generating a feature vector with dimensionality less than a dimensionality associated with the one or more feature maps. The method may also include flattening the feature vector and inputting the flattened feature vector as a layer in a neural network. The method may further include outputting by the neural network a classification associated with the object.

A system of detecting an object, in one aspect, may include a hardware processor coupled with a memory device. The hardware processor operable may be operable to at least receive image data. The hardware processor operable may be further operable to convolve the image data with one or more kernels, the convolving generating corresponding one or more feature maps. The hardware processor operable may be further operable to extract region of interest maps from the one or more feature maps. The hardware processor operable may be further operable to pool the region of interest maps based on one or more features selected as selective features to generate a feature vector with dimensionality less than a dimensionality associated with the one or more feature maps. The hardware processor operable may be further operable to flatten the feature vector and inputting the flattened feature vector as a layer in a neural network. The hardware processor operable may be further operable to output by the neural network a classification associated with the object.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIGS. 4A and 4B illustrate sparse kernels in one embodiment.

FIG. 5 shows pooled (ROI) features in an embodiment.

DETAILED DESCRIPTION

Systems, methods and techniques (generally referred to as a methodology) are disclosed that provide a compact feature representation for object detection, for example, under Region with Convolutional Neural Network (RCNN) framework, resulting in a smaller model size and faster detection speed, and selective object detection. Embodiments of the methodology in the present disclosure are applicable to real-time computer application and mobile device, and leave smaller memory footprint, low computational load, and low power consumption. For example, in embodiments, techniques are presented to reduce the dimensionality ROI features for building compact but effective object detectors.

While region of interest (ROI) features are high-dimensional, it is also observed that they are sparse and redundant, especially for small objects. FIG. 5, for example, shows pooled ROI features in an embodiment. As shown, pooled ROI features are sparse (few non-zero entries) and redundant (repeated values). In an embodiment, feature selection techniques are applied in ROI pooling to reduce the dimensionality of ROI features. In an embodiment, features considered to be the most important features may be selected based on statistical analysis or considering the neighboring redundancy by keeping either even-indexed or odd-indexed features to reduce model parameters without losing accuracy. In an embodiment, machine learning techniques such as least absolute shrinkage and selection operator (LASSO), sparse encoding, and/or regularized sparsity, may be employed for automatic and data-driven feature selection. The reduced ROI features allow for using fewer nodes on the fully connected (FC) layers, leading to a further reduction in model size, for example, an overall of more than 10-times reduction of model size and approximately 2-times reduction of floating point operations per second (FLOP)s. In one aspect, the methodology of the present disclosure incurs no overhead cost (e.g., feature ranking may be done off-line, and important features are indexed for inference). Compact features lead to compact models, for example, fewer nodes on FC layers.

Figure 1:
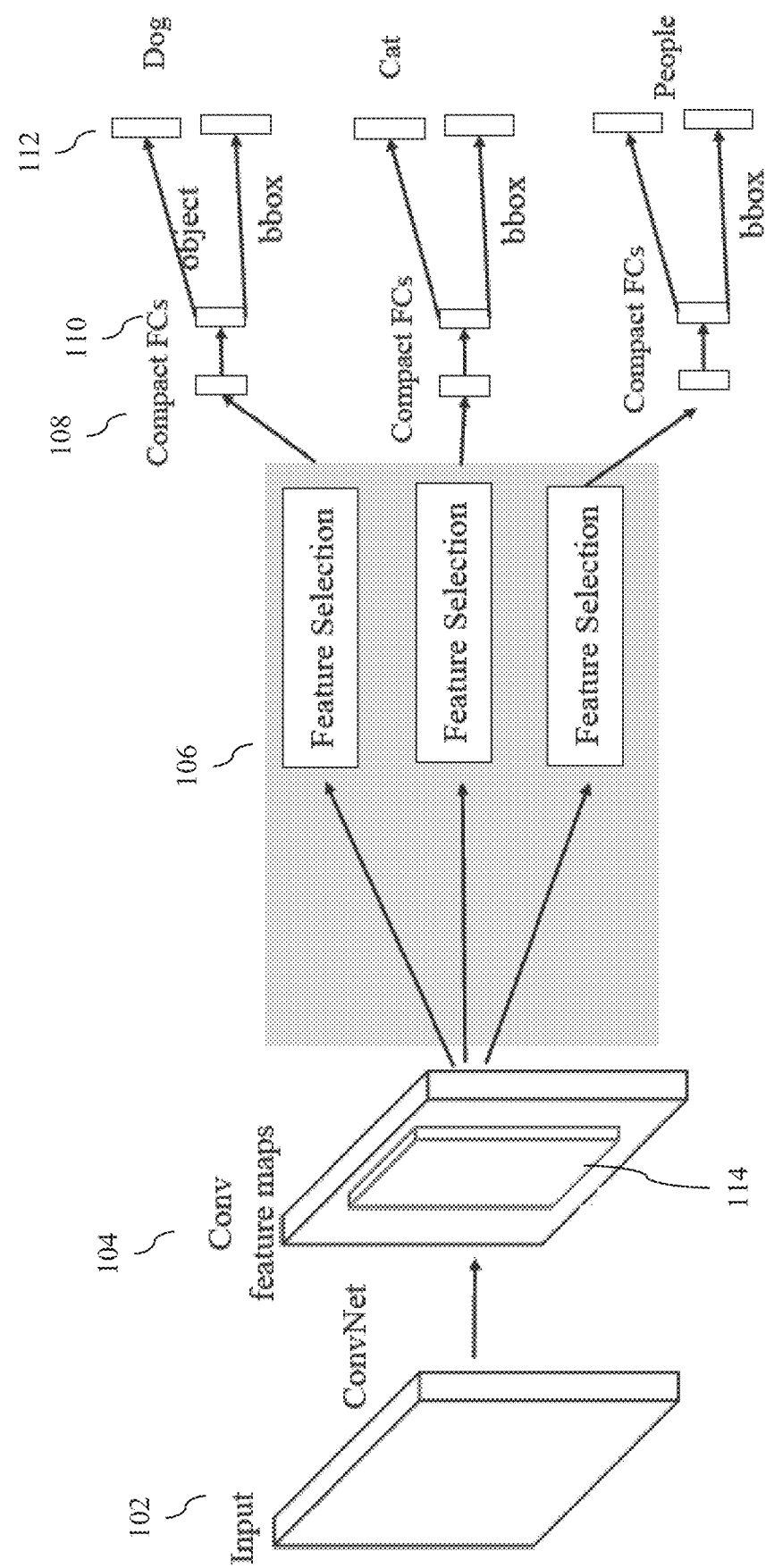
FIG. 1 is a diagram illustrating convolutional neural network (CNN) architecture in one embodiment.

FIG. 1 is a diagram illustrating convolutional neural network (CNN) architecture in one embodiment. In an embodiment the CNN provides for sparse ROI feature representation, compact FC layers, class-aware feature selection and object recognition and bounding box regression. A CNN model may include input data 102, which may be convolved with one or more kernels, filters or convolutional layers, and generate feature maps 104. Briefly, a CNN kernel or filter is convolved with input data for detecting a feature. A CNN can have multiple kernels, filters or convolutional layers, for example, each of which may be convolved with input data, to detect a respective feature. A feature map represents a map of detected feature in input data. Region of interest feature, for example, may be extracted from a given ROI on the feature maps 104. In an embodiment, a region of interest may be pooled, for example, based on feature selection at layer 106. In an embodiment, feature selection 106 in this pooling layer includes selecting features, for example, based on a statistical algorithm or another algorithm. Examples of statistical algorithm may include, but are not limited to, LASSO, sparse encoding, and/or regularized sparsity.

The processing 106 in an embodiment performs a class-aware feature selection. For instance, 3 feature selection boxes are used for different classes, for instance, if the CNN model works for 3 classes (e.g., FIG. 1 shows classifications of dog, cat and people). The number of the feature selection boxes depends on the number of classes, for example, the number of feature selection boxes may grow along with the number of classes. At 106, pooled features from an ROI region are fed into a class-aware feature selection to select features. The pooled features here may include a cropping of the ROI region 114. In an embodiment, the inputs of each feature selection box are the same, feature vectors and the outputs of each feature selection box are still feature vectors but with less than or equal to dimension of the inputs. To select a feature, the feature selection may rank feature based on statistical algorithm. Each feature may be ranked, and therefore, based on a desired number of features to keep (e.g., configured number), feature selection at 106 may discards other features. In one image (e.g., input image data), there may be multiple ROI regions (although FIG. 1 shows one at 114)

Feature selection layer 106 further reduces the dimensions of an output by ranking the importance of features pooled from ROI region, and flattens the features into 1-dimensional vector to fully connected layers 108, 110. Fully connected layers connect every node in one layer to every node in another layer. Fully connected layers 108, 110, for example, are multi-layer perceptron neural network (MLP). Fully connected layers 108, 110 are trained as neural network layers, for example, to produce an output 112, which for example may be a class of an object, for example, determined via classification or regression technique. In an embodiment, as an example, a classification that is output by the fully connected layers 108, 110 may be a one-vs-all (or one-vs-rest) classification, which fits one binary classifier per class. For example, a class is fitted against all other classes. Referring to 108 and 110, fully-connected layers connect all neurons in the current layer to all neurons at the next layer. At 112, in an embodiment, two types of output are generated from 110: (1) classification results; and (2) bounding box regression. The classification results denote whether or not the input belonged to this class (binary) and the bounding box regression tells the difference of the ROI region from the real bounding box which bounds the object.

Figure 2:
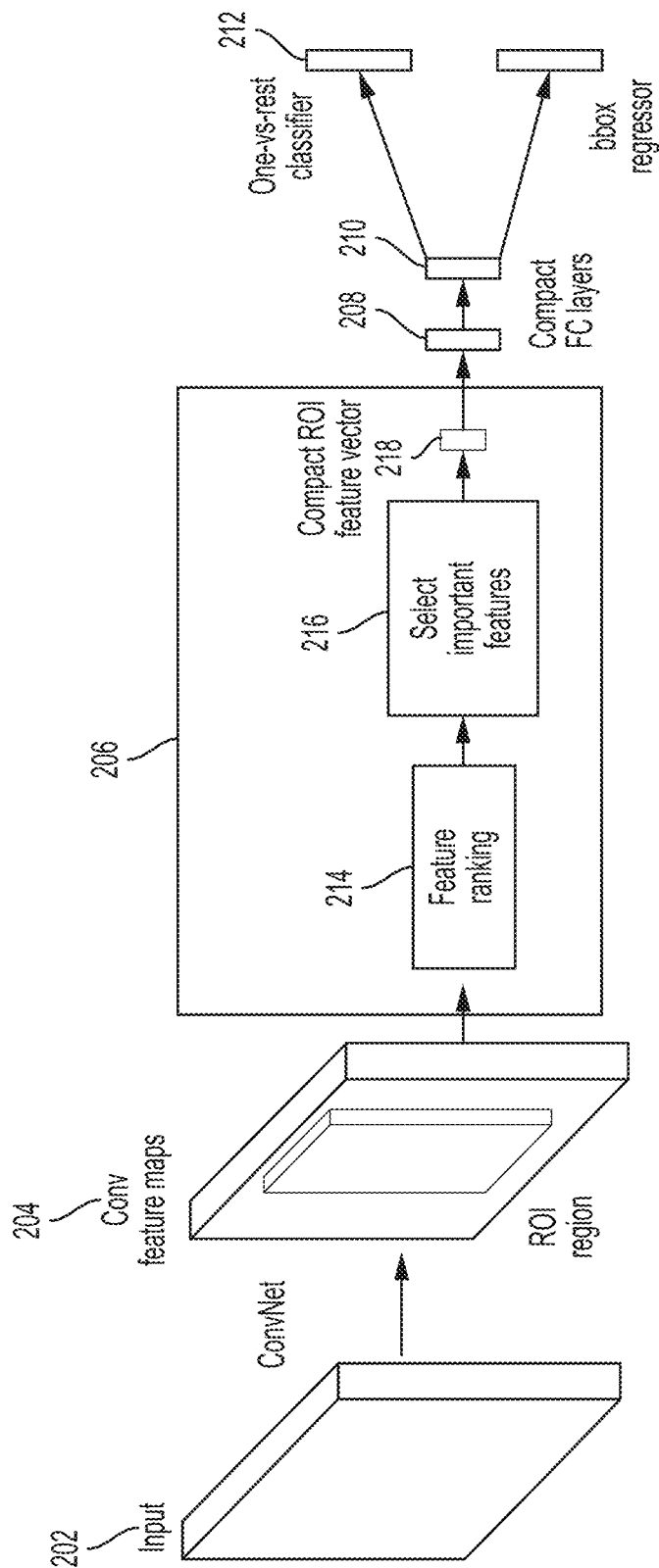
FIG. 2 is another diagram illustrating convolutional neural network (CNN) architecture in one embodiment.

FIG. 2 is another diagram illustrating convolutional neural network (CNN) architecture in one embodiment. In an embodiment, a CNN, for example, may only pool important or selective features in a ROI, for example, instead of direct max-pooling (e.g., used in RCNN). In one embodiment, the CNN may deploy feature ranking techniques to measure importance features. For example, for each targeted class (based on one-versus (vs)-rest classifier), the CNN may learn a corresponding pattern to extract important features. In this way, the CNN may be considered to be data-driven.

The CNN may also sub-sample odd or even indexed features directly. In an embodiment, this type of feature selection approach is considered to be deterministic since the feature selection is based on the feature location. For instance, spatial information may be used to reduce redundant neighboring pixels in an image. For example, input may be sub-sampled as a feature representation. In this way, the CNN may be considered deterministic. Both approaches can help to train a compact CNN, more compact than a conventional RCNN, reducing both model size and computations.

As an example, consider an input layer 202, for example, H (height)×W (width)×C (channel) dimensional image data (pixel data). The input layer 202 is convolved with a set of kernels or filters (for detecting corresponding features in the input image data) and produces or generates convolved data, also referred to as feature maps 204. One or more regions of interest (ROIs) are further reduced in dimensionality, in an embodiment, via feature selection 206. For example, features are ranked at 214 and selected at 216. For instance, a processing at 214 receives convolved features and ranks the importance of features by approaches such as sparse regression, sparse coding, and/or LASSO. A processing at 214 outputs a ranked feature vector. In an embodiment, a plurality of feature rankings may be performed, for example, a data-driven ranking with sparse coding, LASSO, or another algorithm; and a deterministic ranking with a sub-sampling technique. The data-driven ranking, in an embodiment, uses the values of features to rank the importance. The deterministic ranking, in an embodiment uses the locations of features (e.g., even-indexed location is more important than odd-indexed location). For example, image pixels are sampled from a subset of locations of the feature vector. The input received at 214 is convolved features with a particular dimension and the processing at 214 outputs a ranked feature vector with the same dimension.

A processing at 216 receives as input the ranked feature vector (a feature vector with ranking information) and also may receive as input a desired threshold, for example, which determines how many unimportant features are to be removed. In another aspect, desired threshold may be pre-defined or pre-configured. A processing at 216 outputs a feature vector with a lower dimension than the input ranked feature vector, for instance, with unimportant features removed, e.g., a compact ROI feature vector 218. In one aspect, this ranking approach is based on the input data, and therefore is considered as a data-driven approach.

ROI feature vector 218 is generated by pooling the feature maps 204 based on the selected features. ROI feature vector 218 is input to fully connected layers 208, 210, which outputs outcomes 212, for example, a classification of a detected object and a bounding box of the detected object (location boundaries of the image data where the object is detected).

In an embodiment, machine learning is deployed to pool features whose dimension is lower than the original one. In another embodiment, a statistic-based approach may be deployed to pool features whose dimension is lower than the original one. For example, an embodiment of a methodology makes sparse the dimension of pooled features. A network structure of the present disclosure for object detection according to an embodiment allows for selective object detection.

Figure 3:
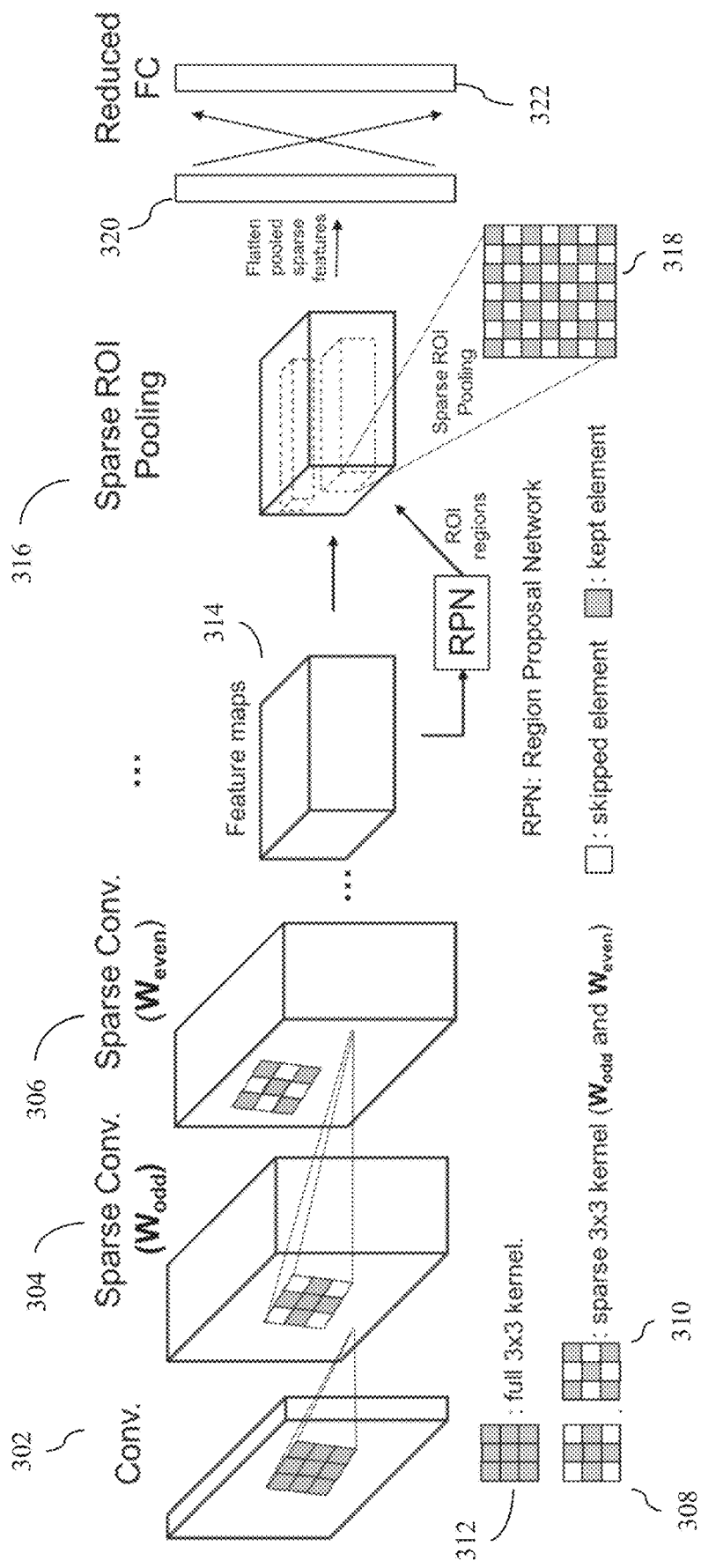
FIG. 3 is another diagram illustrating convolutional neural network (CNN) architecture in one embodiment.

FIG. 3 is another diagram illustrating convolutional neural network (CNN) architecture in one embodiment. In an embodiment, the CNN 302 is subsampling the odd-index of pooled features and reducing FC size to reduce a model size and computations, for example, 10-times reduction of model size and approximately 2-times reduction in computation.

For instance, a wearable camera or another device may implement a sparse feature representation for a faster RCNN detection framework in objection detection. In an embodiment sparse convolution and sparse ROI pooling are developed to reduce model complexity and computational cost. In an embodiment, sparse convolution may include manually-designed sparse kernels to approximate the full kernels in a model, while sparse ROI pooling skips identical features at consecutive locations in ROI pooling for dimensionality reduction, which spatially complement each other.

In an embodiment, the CNN architecture reduces parameter redundancy at different layers in a detection model by using different techniques. For convolution layers 302, 304, 306, in an embodiment, two sparse kernels 308, 310 (also referred to as filters in CNN) approximate full convolutions 312 directly. In an embodiment, the sparse kernels are generated so that they are spatially complementary, with non-zero weights either at the even or odd indices of a full kernel. The two kernels alternate in sequence to substitute the full kernels in a CNN model, for example, as shown in FIG. 3 at 304 and 306. In one aspect, this approach uses deterministic sparse kernels that allows for training a model from scratch, for example, and need not depend on pre-trained models.

Features from the ROI pooling layer are high dimensional. In an embodiment, the CNN architecture implements sparse ROI pooling 318 at a pooling layer 316 of the CNN to reduce the dimensionality of the feature maps 314 (e.g., which have been convolved with the kernels 308, 310). In an embodiment, similar to the sparse convolution described above, sparse ROI pooling 318 skips either the odd-indexed or the even-indexed features to avoid pooling a same neuron response on the output feature maps. This halves the number of parameters at the first fully connected (FC) layers 320, 322, yet without compromising the capability of feature representation. Evaluation data with real data set shows that reduced FC layers with low capacity are sufficient to provide good recognition capabilities for face and person objects, e.g., from body cameras.

In an aspect, the CNN architecture of the present disclosure according various embodiments allows for a sparse feature representation that enables VGG-based faster RCNN to achieve at least a) a 10-times reduction of model parameters and b) a computational speedup by a factor of nearly 2-times.

Sparse CNNs

A limitation in existing kernel sparsification is that sparsity penalties often lead to irregular patterns in kernels, which may render computational gain in practice either too small or highly dependent on dedicated software or hardware handlings. In addition, sparsity learning usually starts with a pre-trained model, which is fine tuned afterwards. To overcome such limitations in sparsity learning, an embodiment of a CNN in the present disclosure designs a plurality of (e.g., two) sparse kernels to approximate full convolutions in CNN models. The two kernels, e.g., denoted by $W_{even}$ and $W_{odd}$ respectively, are mathematically expressed by, a. $W_{even_{i,j,c,n}}=0$, if $(j \times k+i) \bmod 2 \neq 0$ b. $W_{odd_{i,j,c,n}}=0$, if $(j \times k+i) \bmod 2 \neq 1$ 1. and $(j \neq \lfloor k/2 \rfloor$ and $i \neq \lfloor k/2 \rfloor)$, (1)

where (i, j) specifies the spatial location of a cell in a kernel, k is the kernel size, c is the channel index and n denotes the kernel index. In an embodiment, the CNN keeps the center point nonzero for both $W_{odd}$ and $W_{even}$. This location (center point) may often carry a large weight in the kernel in feature representation.

FIGS. 4A and 4B show the sparse patterns for 3×3 and 5×5 kernels, of $W_{even}$ and $W_{odd}$ kernels respectively, in an embodiment. When the kernel size is 3×3, $W_{even}$ becomes an x shape and $W_{odd}$ is a +shape. In an embodiment, $W_{odd}$ and $W_{even}$ complement each other as a join of them in the spatial domain gives rise to a full coverage of the receptive field of the kernel. In an embodiment, such a design can compensate for local details that are missing in sparse convolution but useful for object detection. In an embodiment, the kernels are based on deterministic patterns, for example, indicating that there is no need to use an index table to store their patterns in memory. Therefore, as opposed to existing techniques, this approach provides more consistent empirical running time with regards to the theoretical FLOPs analysis.

Sparse ROI Pooling

FIG. 5 illustrates sparse ROI pooling in one embodiment. ROI pooling may lead to sparse and redundant features, especially at horizontally or vertically consecutive locations (highlighted by the boxes). In an embodiment, sparse ROI pooling in the present disclosure skips either the odd-indexed or even-indexed features for dimensionality reduction. By doing so, it halves the number of parameters at fully connected layers without compromising the capability of feature representation.

ROI pooling in faster RCNN converts a CNN feature map inside a region proposal, e.g., by max pooling into a smaller feature map with a fixed spatial extent. The pooled features are subsequently connected to the first fully connected layer. Fully connected layer may be overly parameterized, which is largely attributed to the high dimensionality of the ROI features. For example, in a known CNN model for computer vision, there can be a total of 25,088 ROI features, yielding 103 million parameters at a fully connected layer that accounts for 70% of the total model size. It is thus desirable to perform dimensionality reduction on the ROI features for a compact detector. In an aspect, ROI features are not only sparse but can become redundant. In ROI pooling, a region proposal is first projected to the feature map, down-sampled by a significant factor a (e.g., a=16). If either side of the projected bounding box is smaller than the pooling size, then the same neuron activation is pulled multiple times for consecutive locations in the output, either in the horizontal or vertical direction. In some images, persons and faces are often small, resulting in many identical features from ROI pooling, as shown by the example in FIG. 4.

In an embodiment, a CNN of the present disclosure implements sparse ROI pooling, for instance, similar to sparse convolution, to reduce the dimension of the ROI features. To avoid pooling identical features at consecutive locations, sparse ROI pooling in an embodiment takes either the odd-indexed or even-indexed features, but not both, as the output of the ROI pooling layer. This approach is principally different from using a smaller pooling size, which results in a coarser feature representation that likely compromises detection accuracy. Despite its simplicity, sparse ROI pooling halves the number of parameters at a fully connected layer of the CNN, yet still performing similarly to the baseline models, as shown in experiments. In one aspect, and according to experimental data, sparse ROI pooling improves accuracy on small objects, and leads to computational savings.

Reduced Fully Connected (FC) Layers

FC layers in a CNN may account for most of the model parameters. Although FC layers are employed for faster RCNN to achieve good performance, the number of their neurons in the FC layers can be reduced without leading to much accuracy loss, for example, in person and face detection, for example, on body camera data. In an embodiment, a technique may be applied reduce the capacity of a network in the FC layers.

In one aspect, a CNN model according to CNN architecture disclosed herein may be trained from scratch using hyper-parameters of a baseline network such as momentum and weight decay, initial learning rate, batch size, and others. In training, the learning rate may be reduced by a number (e.g., 10), for example, each time the validation error reaches a plateau. Training data may be augmented by flipping horizontally and, for example, pre-processing data with mean subtraction. Multi-phase training scheme may be adopted for faster RCNN, and fine tune the detectors under a predefined default setting.

Figure 6:
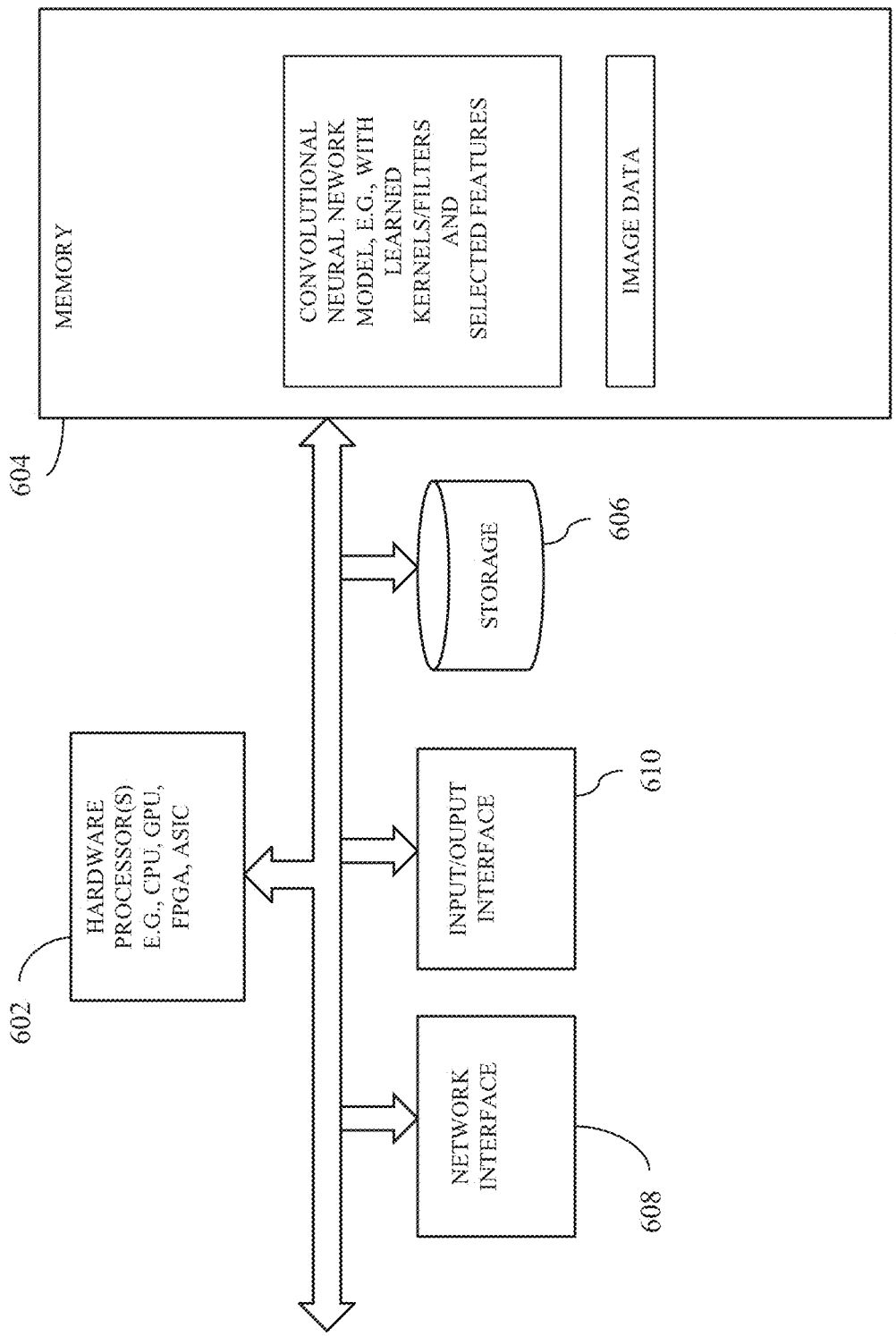
FIG. 6 is a diagram showing components of a system in one embodiment that implements a convolutional neural network (CNN) and object detection.

FIG. 6 is a diagram showing components of a system in one embodiment that implements a CNN and object detection, for example, as described above. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate a prediction model and recommend communication opportunities. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 604 may, for example, store instructions and/or data for functioning of the one or more hardware processors 602, and may include an operating system and other program of instructions and/or data. The one or more hardware processors 602 may receive input comprising image data, for instance, to detect one or more objects in the image data. For instance, at least one hardware processor 602 may run a CNN model, for example, generated with learned kernels or filters for one or more convolution layers and feature selection for a pooling layer. In one aspect, an image data and/or CNN model may be stored in a storage device 606 or received via a network interface 608 from a remote device, and may be temporarily loaded into the memory device 604 for performing object detection. In an embodiment, one or more of the hardware processors 602 may perform training of the CNN model based on training data, which may be labeled with classification of objects. One or more learned kernels and feature selection may be stored on memory 604, for example, for use one or more hardware processors 602 executing the CNN model. For instance, a hardware processor 602 may convolve the image data with one or more kernels, the convolving generating corresponding one or more feature maps. A hardware processor 602 may extract region of interest maps from the one or more feature maps, pool the region of interest maps based on one or more features selected as selective features to generate a feature vector with dimensionality less than a dimensionality associated with the one or more feature maps. A hardware processor 602 may flatten the feature vector and use the flattened feature vector as a layer in a neural network. The neural network outputs a classification associated with the object. The one or more hardware processors 602 may be also coupled with interface devices such as a network interface 608 for communicating with remote systems, for example, via a network, and an input/output interface 610 for communicating with input and/or output devices such as a keyboard, mouse, display, and/or others.

Figure 7:
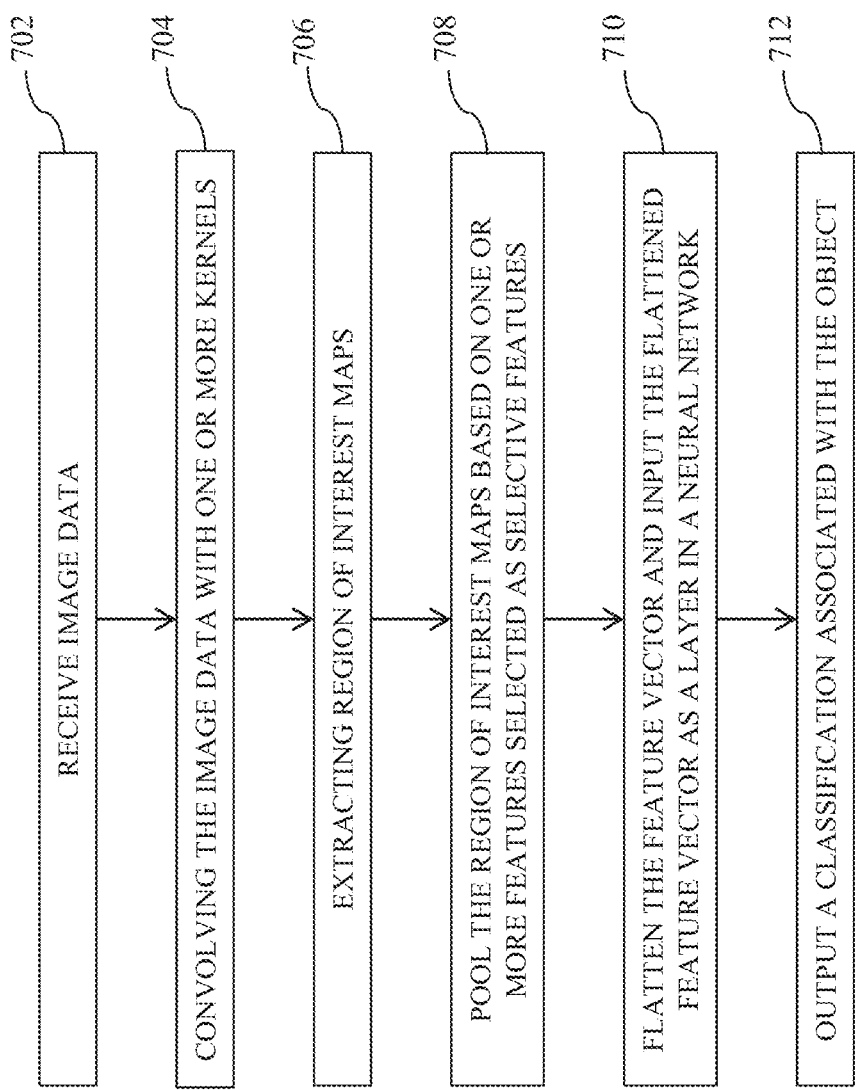
FIG. 7 is a flow diagram illustrating a method of detecting an object in an image in one embodiment.

FIG. 7 is a flow diagram illustrating a method of detecting an object in an image in one embodiment. The method is executed by at least one hardware processor. At 702, image data is received. Image data may include real-time data such as image captured by a camera at a location or camera coupled with a wearable device. At 704, the image data is convolved with one or more kernels. Convolving, for example, performs an element-wise product of the filter and a window slice of the image data, which element-wise products are summed to produce an element of a feature map. This element-wise operation is performed on slides of the image data. A slide parameter may be one, as an example. Another slide may be used, and is configurable. The convolving generates corresponding one or more feature maps.

At 706, region of interest maps may be extracted from the one or more feature maps. For instance, areas of feature maps determined to have objects are extracted. At 708, the region of interest maps are pooled based on one or more features selected as selective features. For example, at 708, features are pooled through a feature selection approach, for example, ranking the importance of features, and gathering the features with higher ranks only. The pooling generates a feature vector with dimensionality less than a dimensionality associated with the one or more feature maps. In an embodiment, the selective features are selected by executing a statistical algorithm on data representing classes of objects. Examples of a statistical algorithm include, but are not limited to, absolute shrinkage and selection operator (LASSO), sparse encoding, and regularized sparsity. In an embodiment, features considered to be important in identifying an object are determined offline, for example, using one or more of the statistical algorithms, and/or by machine learning. In this way, in an embodiment, the region of interest maps have dimensionality less than the feature maps, and the feature vector has dimensionality less than the region of interest maps. In an embodiment, the feature vector may be further pooled based on sub-sampling, for example, sampling a selected cells of pixels of image data such as odd-indexed or even-indexed sampling. Another location-based sampling may be employed.

At 710, the feature vector is flattened and input as a layer in a neural network, for example, a fully connected multilayer perceptron neural network. At 712, the neural network outputs a classification associated with the object. In an embodiment, the neural network is trained to output one versus rest classification.

Figure 8:
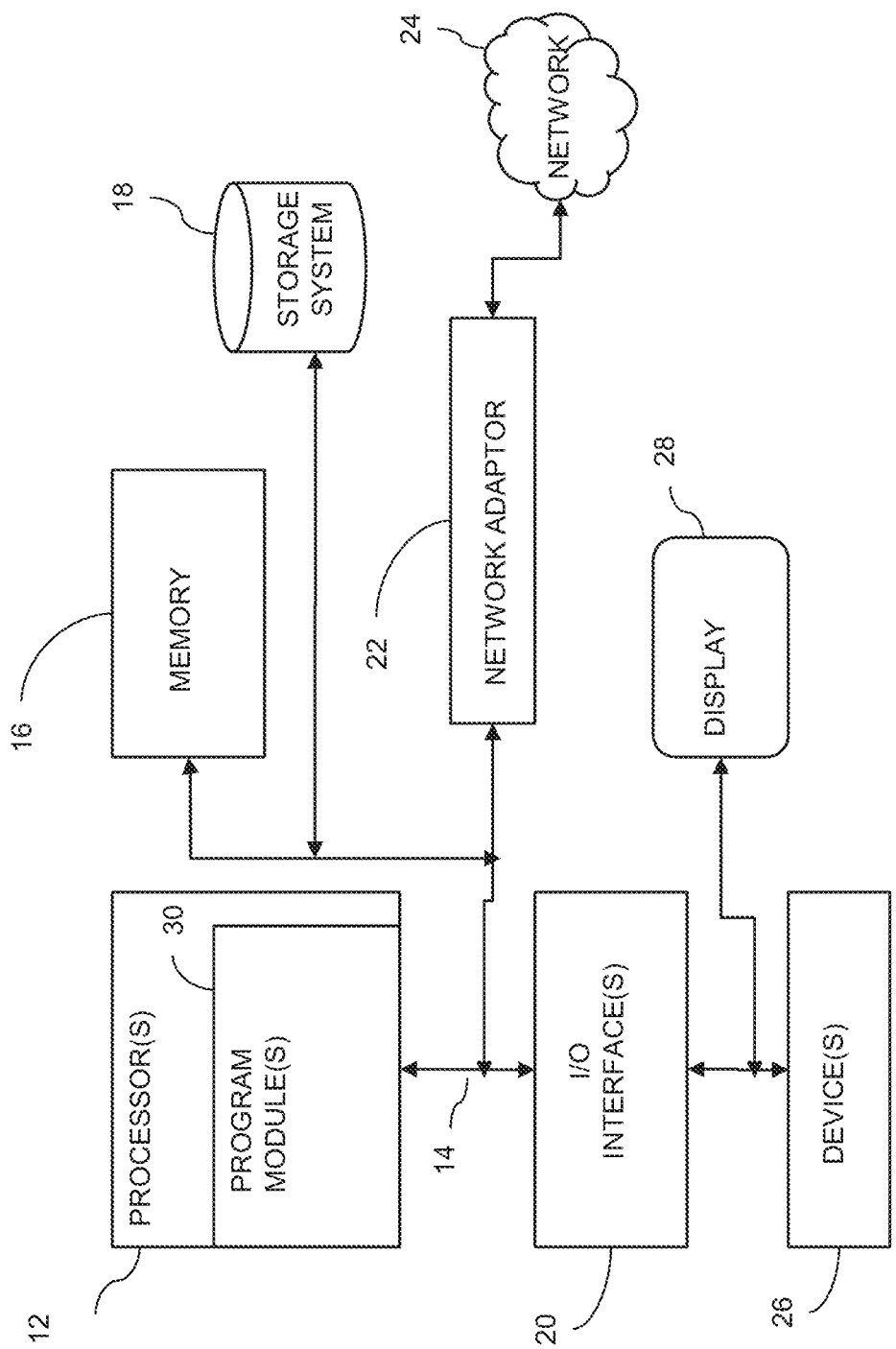
FIG. 8 illustrates a schematic of an example computer or processing system that may implement a system according to one embodiment.

FIG. 8 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed:

1. A computer-implemented method of detecting an object, comprising:
receiving image data;
convolving the image data with a kernel, the convolving generating a corresponding feature map;
extracting a region of interest map from the feature map;
pooling one or more features selected as one or more selective features in the region of interest map without pooling the region of interest map in entirety, the pooling generating a feature vector with dimensionality less than a dimensionality associated with the region of interest map;
flattening the feature vector and inputting the flattened feature vector as a layer in a neural network; and
outputting by the neural network a classification associated with the object,
wherein the one or more selective features are selected by executing a statistical algorithm on data representing classes of objects and ranking features in the region of interest map, wherein the one or more selective features are selected from the ranked features in the region of interest map based on meeting a threshold.

2. The method of claim 1, wherein the neural network comprises a fully connected multi-layer perceptron neural network.

3. A computer program product comprising a non-transitory computer readable storage medium having program instructions embodied therewith, the program instructions readable by a device to cause the device to:
   receive image data;
   convolve the image data with a kernel, the convolving generating a corresponding feature map;
   extract a region of interest map from the feature map;
   pool one or more features selected as one or more selective features in the region of interest map without pooling the region of interest map in entirety, the pooling generating a feature vector with dimensionality less than a dimensionality associated with the region of interest map;
   flatten the feature vector and inputting the flattened feature vector as a layer in a neural network; and
   output by the neural network a classification associated with the object,
   wherein the one or more selective features are selected by executing a statistical algorithm on data representing classes of objects and ranking features in the region of interest map, wherein the one or more selective features are selected from the ranked features in the region of interest map based on meeting a threshold.

4. The computer program product of claim 3, wherein the pooling further comprises sub-sampling the feature vector by sampling image pixels from a subset of locations of the feature vector.

5. The method of claim 1, wherein the neural network is trained to output one versus rest classification.

6. The method of claim 1, wherein the statistical algorithm comprises at least one of least absolute shrinkage and selection operator (LASSO), sparse encoding, and regularized sparsity.

7. The method of claim 1, wherein the one or more selective features are selected offline.

8. The method of claim 1, wherein the region of interest map has dimensionality less than the feature map.

9. The method of claim 1, wherein the pooling further comprises sub-sampling the feature vector by sampling image pixels from a subset of locations of the feature vector.

10. The computer program product of claim 3, wherein the neural network comprises a fully connected multi-layer perceptron neural network.

11. The computer program product of claim 3, wherein the statistical algorithm comprises at least one of least absolute shrinkage and selection operator (LASSO), sparse encoding, and regularized sparsity.

12. The computer program product of claim 3, wherein the one or more selective features are selected offline.

13. The computer program product of claim 3, wherein the region of interest map has dimensionality less than the feature map.

14. A system of detecting an object, comprising:
   a hardware processor coupled with a memory device,
   the hardware processor operable to at least:
   receive image data;
   convolve the image data with a kernel, the convolving generating a corresponding feature map;
   extract a region of interest map from the feature map;
   pool one or more features selected as one or more selective features in the region of interest map without pooling the region of interest map in entirety to generate a feature vector with dimensionality less than a dimensionality associated with the region of interest map;
   flatten the feature vector and inputting the flattened feature vector as a layer in a neural network; and
   output by the neural network a classification associated with the object,
   wherein the one or more selective features are selected by executing a statistical algorithm on data representing classes of objects and ranking features in the region of interest map, wherein the one or more selective features are selected from the ranked features in the region of interest map based on meeting a threshold.

15. The system of claim 14, wherein the neural network comprises a fully connected multi-layer perceptron neural network.

16. The system of claim 14, wherein the neural network is trained to output one versus rest classification.

17. The system of claim 14, wherein the statistical algorithm comprises at least one of least absolute shrinkage and selection operator (LASSO), sparse encoding, and regularized sparsity.

* * * * *